(12) United States Patent
Santi et al.

(10) Patent No.: US 12,236,414 B2
(45) Date of Patent: Feb. 25, 2025

(54) FIXED RETAIL SCANNER WITH DISTRIBUTED ON-BOARD ARTIFICIAL INTELLIGENCE (AI) ACCELERATOR MODULES AND RELATED METHODS

(71) Applicant: Datalogic USA, Inc., Eugene, OR (US)

(72) Inventors: Stefano Santi, Eugene, OR (US); Aric Zandhuisen, Eugene, OR (US); Brett Howard, Eugene, OR (US); Steven Gutke, Eugene, OR (US)

(73) Assignee: Datalogic IP Tech S.R.L., Bologna (IT)

( * ) Notice: Subject to any disclaimer, the term of this patent is extended or adjusted under 35 U.S.C. 154(b) by 258 days.

(21) Appl. No.: 18/086,552

(22) Filed: Dec. 21, 2022

(65) Prior Publication Data

US 2023/0206206 A1 Jun. 29, 2023

Related U.S. Application Data

(60) Provisional application No. 63/342,005, filed on May 13, 2022, provisional application No. 63/293,596, filed on Dec. 23, 2021.

(51) Int. Cl.
*G06Q 20/20* (2012.01)
(52) U.S. Cl.
CPC .................................. *G06Q 20/208* (2013.01)
(58) Field of Classification Search
CPC .................................................... G06Q 20/208
See application file for complete search history.

(56) References Cited

U.S. PATENT DOCUMENTS

| | | | |
|---|---|---|---|
| 8,430,318 B2 | 4/2013 | McQueen et al. | |
| 9,004,359 B2 | 4/2015 | Shearin et al. | |
| 9,305,198 B2 | 4/2016 | Thompson et al. | |
| 10,049,247 B2 | 8/2018 | Gao | |
| 10,248,896 B2 | 4/2019 | Gao et al. | |
| 11,662,986 B1 | 5/2023 | Catron et al. | |
| 2020/0079412 A1* | 3/2020 | Ramanathan | G08B 13/19652 |
| 2020/0125812 A1 | 4/2020 | Canini et al. | |
| 2021/0287013 A1* | 9/2021 | Carter | G06F 18/24 |
| 2021/0295078 A1* | 9/2021 | Barkan | G06V 30/2247 |

\* cited by examiner

*Primary Examiner* — A. Hunter Wilder
*Assistant Examiner* — Joseph M Mutschler
(74) *Attorney, Agent, or Firm* — Foley & Lardner LLP

(57) ABSTRACT

The disclosure includes a fixed retail scanner includes a data reader. The data reader includes a main board including a system processor disposed within the data reader, and one or more camera modules disposed within the data reader and operably coupled with the system processor. Each camera module may include a local on-board imager AI engine configured to perform AI tasks according to a loaded trained AI model. A system artificial intelligence (AI) engine may be disposed within the data reader and configured to perform AI tasks according to a loaded trained AI model. The system processor is operably coupled to each of the imager AI engines and the system AI engine for scheduling and dispatching AI tasks across a distributed network of AI resources including the imager AI engines and the system AI engine.

18 Claims, 7 Drawing Sheets

FIXED RETAIL SCANNER WITH DISTRIBUTED ON-BOARD ARTIFICIAL INTELLIGENCE (AI) ACCELERATOR MODULES AND RELATED METHODS

PRIOR APPLICATIONS

This application claims the benefit of U.S. Provisional Application No. 63/342,005, filed May 13, 2022, and entitled "FIXED RETAIL SCANNER WITH DISTRIBUTED ON-BOARD ARTIFICIAL INTELLIGENCE (AI) ACCELERATOR MODULES AND RELATED METHODS," the disclosure of which is incorporated by reference herein in its entirety. This application also claims the benefit of U.S. Provisional Application No. 63/293,596, filed Dec. 23, 2021, and entitled "FIXED RETAIL SCANNER WITH ON-BOARD ARTIFICIAL INTELLIGENCE (AI) ACCELERATOR MODULE AND RELATED METHODS," the disclosure of which is incorporated by reference herein in its entirety.

TECHNICAL FIELD

The present disclosure relates generally to scanners or code readers, and more particularly, to fixed retail scanners having distributed artificial intelligence (AI) accelerator modules within the scanner and related methods.

BACKGROUND

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes. Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items.

BRIEF SUMMARY

A fixed retail scanner may include a data reader, comprising a main board including one or more processors including a system processor disposed within the data reader, one or more camera modules disposed within the data reader and operably coupled with the system processor, each camera module including a local on-board imager AI engine configured to perform AI tasks according to a loaded trained AI model, and a system artificial intelligence (AI) engine disposed within the data reader and configured to perform AI tasks according to a loaded trained AI model. The system processor is operably coupled to each of the imager AI engines and the system AI engine for scheduling and dispatching AI tasks across a distributed network of AI resources including the imager AI engines and the system AI engine.

A method of operating a fixed retail scanner including a data reader may include receiving image data at a system processor disposed on a main board within the data reader, the system processor operably coupled to one or more camera modules and to a system artificial intelligence engine disposed within the data reader, each camera module including a local on-board imager AI engine configured to perform AI tasks according to a loaded trained AI model, and wherein the system artificial intelligence (AI) engine is configured to perform AI tasks according to a loaded trained AI model, and scheduling and dispatching, via the system processor, AI tasks of the image data across a distributed network of AI resources including the imager AI engines and the system AI engine.

DETAILED DESCRIPTION

Figure 1:
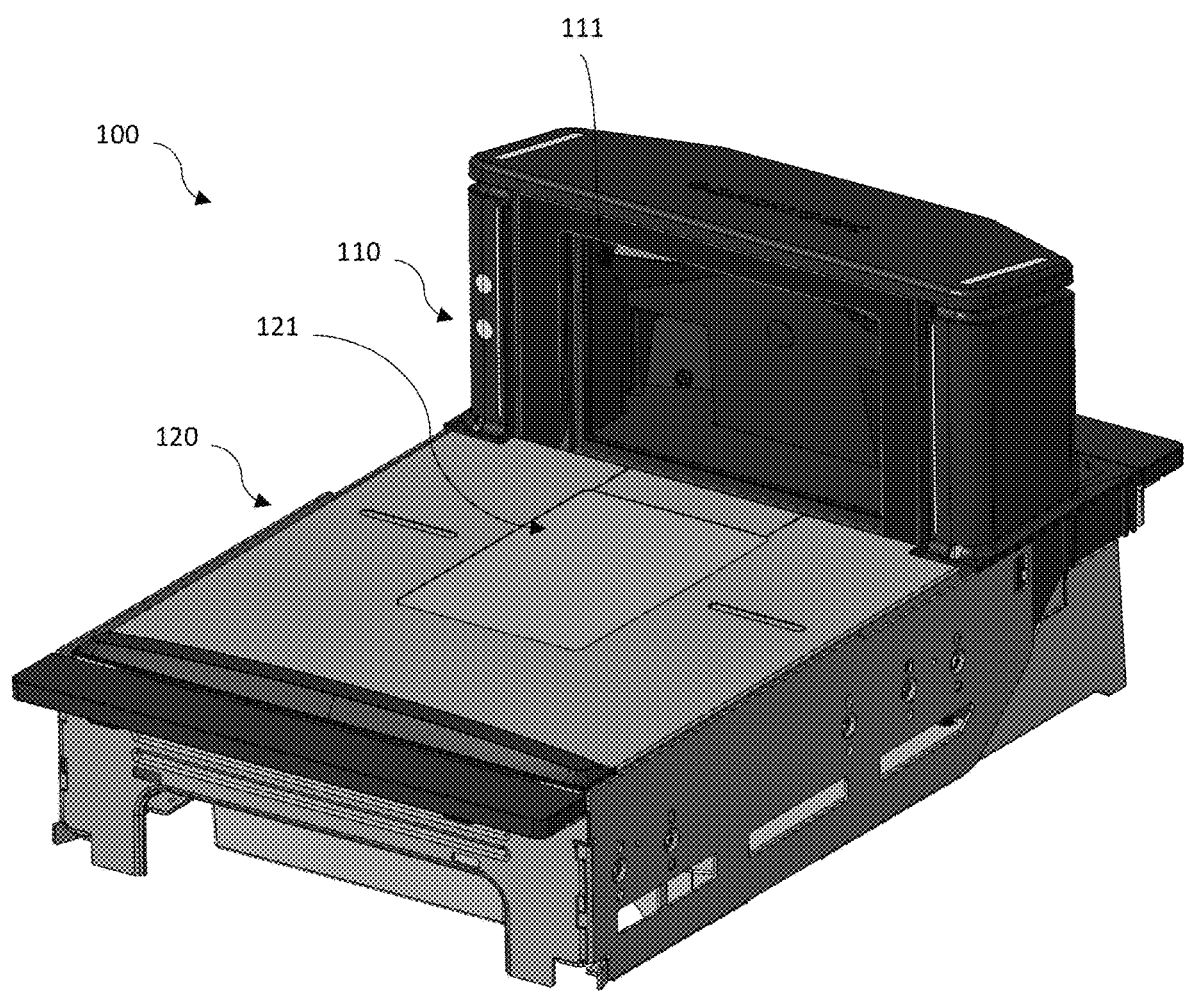
FIG. 1 is a perspective view of a data reader according to an embodiment of the disclosure.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement, such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

"Image data" as used herein may include raw images as well as processed images (e.g., cropped, compressed, etc.) from the raw images as well as other forms of data that is derived from raw image data that provides useful information for image analysis, such as descriptor data, histogram data, etc. Image data may include both individual image frames as well as multiple frames (e.g., streaming video). In some embodiments, raw images may include information arranged in two dimensions which are the x (width) and y (height) coordinates of a 2D sensor. The information at each x, y coordinate may include monochrome data, RGB data, depth data, multi-spectral data, infrared data, etc. as well as combinations thereof (e.g., RGB-depth may be captured by 3D cameras). Image data may be captured by one or more imagers positioned at various within the housing of the fixed retail scanner, such as in a horizontal base unit or a vertical bonnet of a bi-optic scanner having imagers positioned in two different planes. Single plane scanners (e.g., horizontal or vertical only housings) are also contemplated and within the scope of the disclosure. Image data may also be captured by one or more imagers positioned external to the primary scanning unit, such as peripheral devices (e.g., top-down reader imagers, security imagers, bottom of basket readers, etc.) that may also provide image data to the fixed retail scanner and/or remote systems. In some cases, image data and images may be used interchangeably herein.

FIG. 1 is a perspective view of a data reader 100 according to an embodiment of the disclosure. The data reader 100 may be a bi-optic fixed retail scanner having a vertical housing 110 and a horizontal housing 120. The vertical housing 110 may include a structure that provides for one or more camera fields-of-view (through a vertical window 111) within a generally vertical plane across the read zone of the data reader 100. The vertical structure provides an enclosure for one or more cameras and other optical elements (e.g., lenses, mirrors, etc.) and electrical elements (e.g., cables, circuit boards, etc.) therein. The horizontal housing 120 may include a structure that provides for one or more camera fields-of-view (through a horizontal window 121) within a generally vertical plane across the read zone of the data reader 100. The horizontal structure provides an enclosure for one or more cameras and other optical elements (e.g., lenses, mirrors, etc.) and electrical elements (e.g., cables, circuit boards, etc.) therein. Thus, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field-of-view may be physically located within the vertical structure and vice versa.

Figure 2:
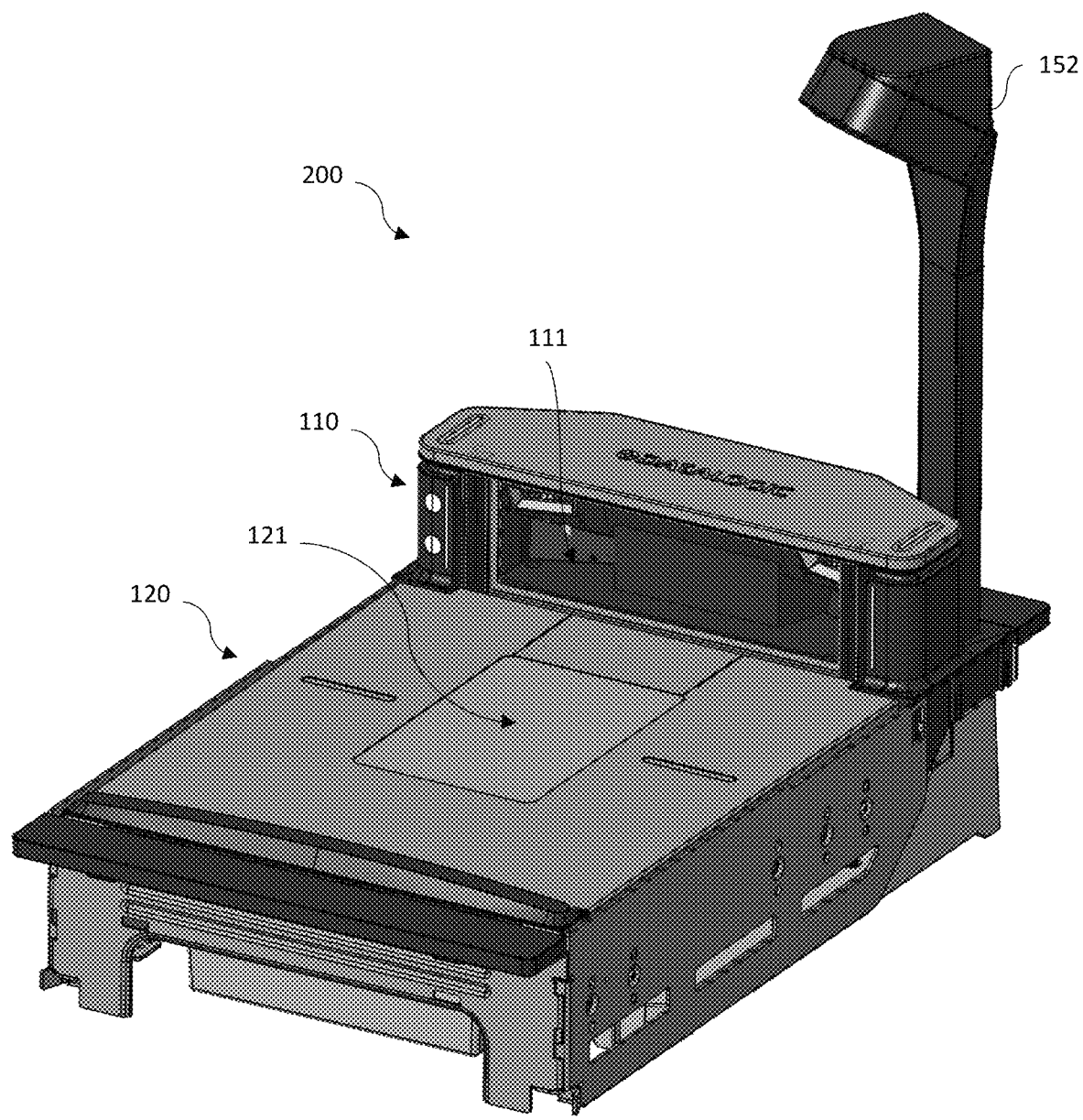
FIG. 2 is a perspective view of a data reader according to an embodiment of the disclosure.

FIG. 2 is a perspective view of a data reader 200 according to an embodiment of the disclosure. As with the data reader of FIG. 1, the data reader of FIG. 2 may also be a bi-optic fixed retail scanner having a vertical housing 110 and a horizontal housing 120. The data reader 200 may also include a top-down reader (TDR) 152 that includes a stand connected to the data reader 100 with a head that includes one or more imagers therein. Such imager(s) typically provide a generally close overhead (angled) view of the read zone to provide a top view of a product whereas internal cameras may be better suited for capturing images of the bottom and/or sides of the object within the read zone.

The vertical housing of FIG. 2 may have a lower profile bonnet compared to that of FIG. 1, which may result in internal cameras having a lower incidence angle. Thus, such a form factor may be particularly well suited to include the TDR 152 as an optional add-on to the data reader 200. However, a TDR 152 may also be coupled to the data reader 100 of FIG. 1 having the taller bonnet. Such a TDR may need to be taller to accommodate the taller bonnet. In addition, some embodiments may include additional TDRs, such as on the other side of the bonnet to provide another top view of the read zone. Thus, some embodiments may include one or more TDRs for data readers having different sized bonnets. It is also recognized that some embodiments may include single plane data readers such that certain features described herein are wholly located within a single plane housing (e.g., horizontal), which may further be coupled to other external devices or peripherals.

Different configurations and details regarding the construction and components of a fixed retail scanner are contemplated. For example, additional features and configurations of devices are described in the following patents and patent applications: U.S. Pat. No. 8,430,318, issued Apr. 30, 2013, and entitled "SYSTEM AND METHOD FOR DATA READING WITH LOW PROFILE ARRANGEMENT," U.S. Pat. No. 9,004,359, issued Apr. 14, 2015, entitled "OPTICAL SCANNER WITH TOP DOWN READER," U.S. Pat. No. 9,305,198, issued Apr. 5, 2016, entitled "IMAGING READER WITH IMPROVED ILLUMINATION," U.S. Pat. No. 10,049,247, issued Aug. 14, 2018, entitled "OPTIMIZATION OF IMAGE FRAME MANAGEMENT IN A SWEEP-STYLE OPTICAL CODE DATA READER," U.S. Pat. No. 10,248,896, issued Apr. 2, 2019, and entitled "DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY," and U.S. Patent Application Publication No. 2020/0125812, filed Dec. 2, 2019, and entitled "DATA COLLECTION SYSTEMS AND METHODS TO CAPTURE IMAGERS OF AND DECODE INFORMATION FROM MACHINE-READABLE SYMBOLS," the disclosure of each of which is incorporated by reference in their entirety. Such fixed retail scanners may be incorporated within assisted checkout stations having a clerk assisting a customer, while some embodiments include self-checkout stations in which the customer is the primary operator of the device. Such components and features may be employed in combination with those described herein.

Figure 3:
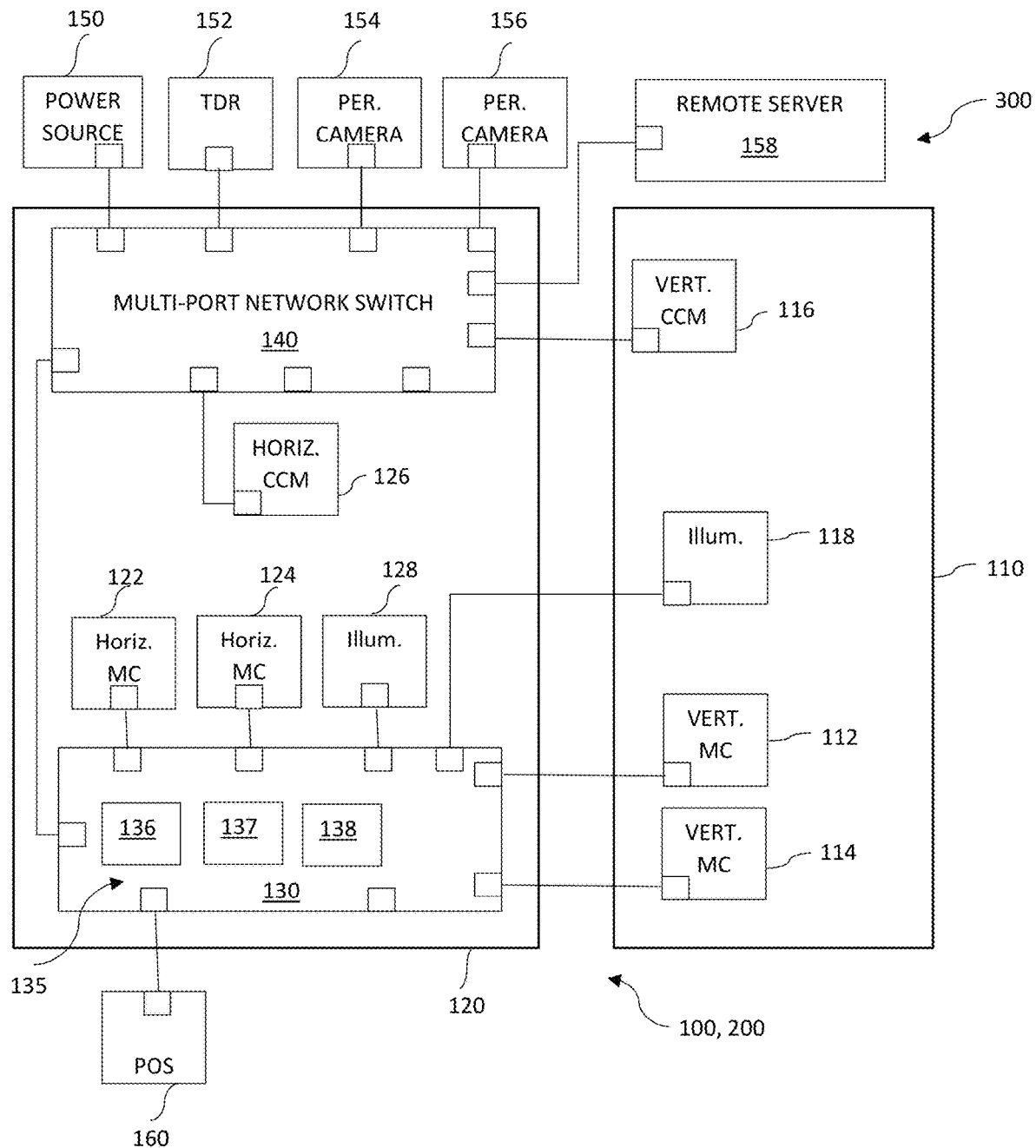
FIG. 3 is a simplified block diagram of a data reading system according to an embodiment of the disclosure.

FIG. 3 is a simplified block diagram of a data reading system 300 according to an embodiment of the disclosure. The data reading system 300 may include a data reader 100, 200 that may be operably coupled with one or more of a power source 150, the top-down reader (TDR) 152, peripheral cameras 154, 156, a remote service 158, or a point of sale (POS) system 160.

The data reader 100, 200 may be a bi-optic fixed retail scanner having a vertical housing 110 and a horizontal housing 120. The data reader 100, 200 may be installed in a retail environment (e.g., grocery store), which is typically disposed within a counter or other support structure of an assisted checkout lane or a self-checkout lane. The vertical housing 110 may include a structure that provides for one or more camera fields-of-view (through a vertical window)

within a generally vertical plane across the read zone of the data reader 100, 200. The vertical structure provides an enclosure for one or more cameras 112, 114, 116, active illumination elements 118 (e.g., LED assemblies), and other optical elements (e.g., lenses, mirrors, etc.) and electrical elements (e.g., cables, circuit boards, etc.) therein. The horizontal housing 120 may include a structure that provides for one or more camera fields-of-view (through a horizontal window) within a generally vertical plane across the read zone of the data reader 100, 200. The horizontal structure provides an enclosure for one or more cameras 122, 124, 126, active illumination elements 128 (e.g., LED assemblies), and other optical elements (e.g., lenses, mirrors, etc.) and electrical elements (e.g., cables, circuit boards, etc.) therein. Thus, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field-of-view may be physically located within the vertical structure and vice versa.

The data reader 100, 200 may include one or more different types of imagers, such as monochrome imagers and/or color imagers. For example, vertical monochrome cameras (MCs) 112, 114 may be configured to capture monochrome images through the vertical window of the data reader 100, 200. Likewise, horizontal monochrome cameras (MCs) 122, 124 may be configured to capture monochrome images through the horizontal window of the data reader 100, 200. Vertical color camera module (CCM) 116 may be configured to capture color images through the vertical window of the data reader 100, 200. Likewise, horizontal color camera module (CCM) 126 may be configured to capture color images through the horizontal window of the data reader 100, 200. Monochrome images may be analyzed (e.g., by a decoder) to decode one or more indicia (e.g., 1D barcodes, 2D barcodes, optical character recognition, digital watermarks, etc.). Color images may be analyzed (e.g., by an image processor) to perform analysis on the images where color information may be particularly advantageous, such as produce recognition, item recognition or verification, security analysis. Such analysis may be performed by local and/or remote processors that may contain an artificial intelligence (AI) engine or otherwise configured to perform other machine learning techniques.

The data reader may further include a main board 130 and a multi-port network switch 140. As shown herein, the main board 130 and the multi-port network switch 140 may be physically housed within the horizontal housing 120. Bi-optic readers tend to have larger horizontal housings in order to provide support for the device within a cavity in a counter, which also provides space for a scale (not shown) used to weigh produce or other items sold by weight or otherwise perform weighing of items when placed on the horizontal surface (often called a "weigh platter"). It is contemplated that some embodiments may include the main board 130 and/or the multi-port network switch 140 to be physically located within the vertical housing 110. In such an embodiment where one of the multi-port network switch 140 or the main board 130 is physically located within the vertical housing 110 and the other is physically located within the horizontal housing 120, the two boards may be oriented generally orthogonal to each other similar to the orientation of the windows or other angled arrangements (e.g., slightly angled orientations such as being in the range of ±10° from orthogonal). The ports may be at least somewhat aligned in the orthogonal direction or other arrangement to accommodate easy connection of network cables therebetween.

The main board 130 may be operably coupled with the vertical monochrome imagers 112, 114 and the horizontal monochrome imagers 122, 124. These connections may be established via a communication interface (e.g., a MIPI interface). The main board 130 may have decoding software embedded therein such that one or more on-board processors 135 may receive monochrome images to perform decoding on the optical indicia and provide the decoding result to a point of sale (POS) system 160 operably coupled thereto to complete a transaction. The one or more on-board processors 135 may also be configured to provide control (e.g., coordination or synchronization) of the various components of the system including camera exposure and timing of active illumination assemblies 118, 128 of the system. It is contemplated that some embodiments may include multiple processing components (e.g., microprocessors, microcontrollers, FPGAs, etc.) configured to perform different tasks, alone or in combination, including object detection, system control, barcode decoding, optical character recognition, artificial intelligence, machine learning analysis, or other similar processing techniques for analyzing the images for product identification or verification or other desired events.

As an example, the one or more on-board processors 135 may include a system processor 136 configured to control system operations (e.g., illumination/camera exposure control) as well as perform certain analysis operations (e.g., barcode decoding). As will be described in more detail below, the system processor 136 may also be configured to perform scheduling and dispatching for AI tasks within a distributed environment with multiple AI engines throughout different modules of the data reader. Each AI engine may be configured to load one or more trained AI models to perform AI tasks as described herein. The one or more on-board processors 135 may also include image processor(s) 137 configured to receive and format image data from the cameras 112, 114, 122, 124 before being received by the system processor 136. In some embodiments, multiple image processors may be present such that each camera 112, 114, 122, 124 may have its own image processor associated therewith. In some embodiments, cameras may share an image processor for transmission to the system processor 136. For example, a single image processor may be configured to combine (e.g., concatenate) the image data from each of the monochrome cameras 112, 114, 122, 124 for the system processor to receive multiple views at a single point in time through one input. An example of such a process is described in U.S. Patent Publication No. 2022/0207969, filed Dec. 31, 2020, and entitled "FIXED RETAIL SCANNER WITH ANNOTATED VIDEO AND RELATED METHODS," the disclosure of which is incorporated by reference in its entirety.

The one or more on-board processor 135 may also include a system AI accelerator module 138 (also referred to as an "AI accelerator" or "AI engine"). The system AI accelerator module 138 may include a tensor processing unit (TPU) configured to run artificial intelligence or other neural network machine learning models from an on-board processor (e.g., ASIC) disposed locally on the main-board 130 within the system. As an example, the system AI accelerator module 138 may be implemented with a Coral Mini PCIe Accelerator or other similar TPU products available from Google Inc. of Mountain View, California configured to perform local AI functionality to the on-board system using the TensorFlow open-source software library for machine learning and artificial intelligence. In some embodiments, the system AI accelerator 138 may be implemented with a Coral M.2 Accelerator available from Google Inc. of Mountain View, California that includes two TPU ML accelerators on the same PCB. Other numbers of ML accelerator chips (e.g., custom ASICs) may be present on a single PCB (or distributes among multiple PCBs) are also contemplated. Such PCIe accelerators may be configured as a PCB card inserted directly into a mini PCIe slot connector located on the main board 130. In some embodiments, the system accelerator module 138 may be installed directly on-board, such as the Coral Accelerator Module which is a solderable multi-chip module including the Edge TPU available from Google Inc. of Mountain View, California Other types of connections are contemplated, including a USB connected AI accelerator inserted into a USB slot. An example of such a system accelerator module 138 is the USB accelerator available from Google Inc. of Mountain View, California Imager AI accelerator modules (described more fully below) may be similarly configured as including one or more ML accelerator chips on the same PCB with the imager.

Figure 5:
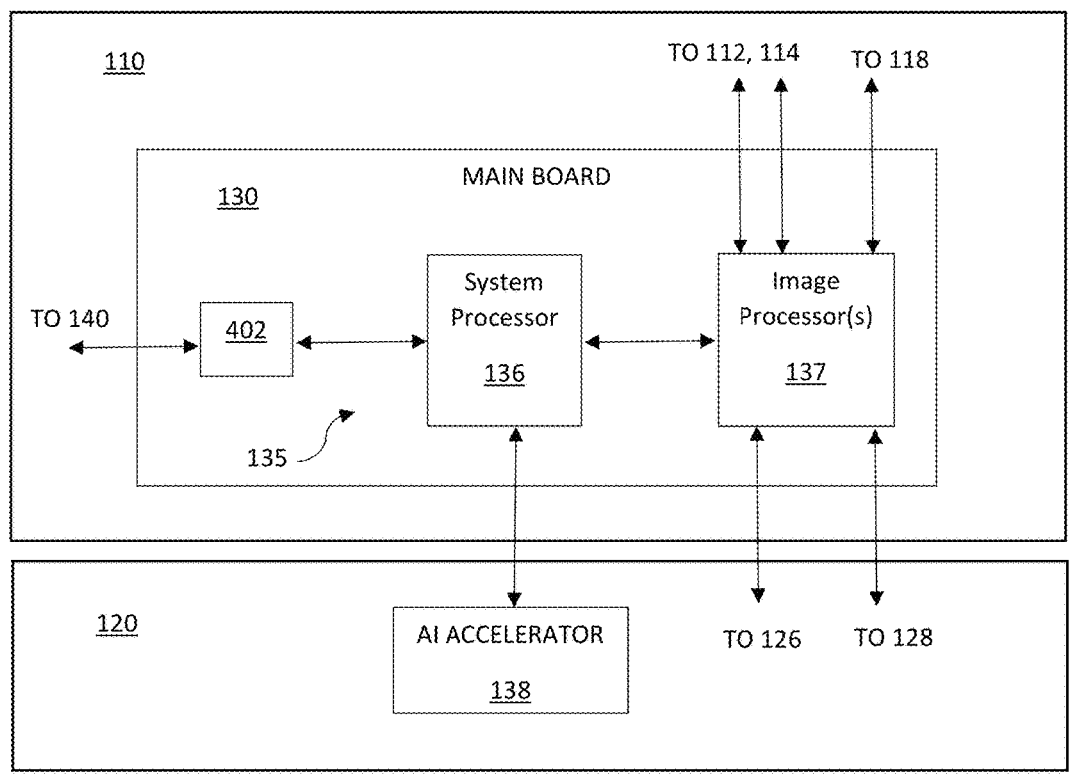
FIG. 5 is a simplified block diagram of certain components mounted on the main board in communication with an AI accelerator disposed within a vertical housing according to an embodiment of the disclosure.

In some embodiments, the system AI accelerator module 138 may be physically disposed within the vertical housing 110 and connected to the main board 130 via an extension cable having a connector that is inserted into the corresponding port (e.g., mini PCIe slot, USB slot, etc.) as shown in FIG. 5. In some embodiments, the system AI accelerator module 138 may be physically disposed within the horizontal housing 120 and connected to the main board 130 via an extension cable having a connector that is inserted into the corresponding port (e.g., mini PCIe slot, USB slot, etc.) as shown in FIG. 5.

The multi-port network switch 140 may be operably coupled to vertical CCM 116 and horizontal CCM 126 located within the data reader 100, 200. The multi-port network switch 140 may also be operably coupled with main board 130 located within the data reader 100, 200. Multi-port network switch 140 may also be operably coupled to the power source 150 as well as peripheral devices, such as the TDR 152, peripheral cameras 154, 156, and/or the remote server 158. The number, and types of peripheral devices, may depend on a desired application within a retail environment. The TDR 152 may be configured as a stand connected to the data reader 100, 200 that typically provides a generally close overhead (angled) view of the read zone to provide a top view of a product whereas internal cameras 112, 114, 116, 122, 124, 126 may be better suited for capturing images of the bottom and/or sides of the object within the read zone. Peripheral cameras 154, 156 may be located remotely from the data reader 100, 200, such as being mounted on a ceiling or wall of the retail environment to provide additional views of the read zone or checkout area. Such views may be useful for security analysis of the checkout area, such as product verification, object flow, human movements, etc. Such analysis may be performed by a remote service or other local devices (e.g., located on or otherwise coupled to the main board 130 or Ethernet switch 140). Other peripheral devices may be located near the data reader 100, 200, such as a peripheral presentation scanner resting or mounted to a nearby surface, and/or a handheld scanner that also may be used for manual capturing by the user (e.g., checkout assistant or self-checkout customer). Such devices may be coupled directly to the main board 130 in some embodiments or to the multi-port network switch 140, if so enabled. As shown, the POS 160 may be coupled directly to the main board 130. Such a connection may be via communication interfaces, such as USB, RS-232, or other such interfaces. In some embodiments, the POS 160 may be coupled directly to the multi-port network switch 140, if so enabled (e.g., as an Ethernet connected device).

The multi-port network switch 140 may be implemented on a separate board from the main board 130. In some embodiments, the multi-port network switch 140 may be implemented on the main board 130 that also supports the one or more processors 135 also described herein. The multi-port network switch 140 may include a plurality of ports to provide advanced network connectivity (e.g., Ethernet) between internal devices (e.g., CCMs 116, 126) within the data reader 100, 200 and external devices (e.g., TDR 152, peripheral camera(s) 154, 156, remote server 158, etc.) from the data reader 100, 200. Thus, the multi-port network switch 140 may provide an Ethernet backbone for the elements within the data reader 100, 200 as well as for external devices coupled to the data reader 100, 200 for control and/or managing data flow or analysis. As an example, multi-port network switch 140 may be implemented with a KSZ9567 Ethernet switch or other EtherSynch® product family member available from Microchip Technology Inc. of Chandler, Arizona or other similar products or devices configured to provide network synchronization and communication with network-enabled devices. Embodiments of the disclosure may include any number of ports supported by the multi-port network switch to couple to both internal devices (e.g., main board, cameras, etc.) and external devices (e.g., peripheral cameras, TDR, illumination sources, remote servers, etc.) to provide a flexible platform to add additional features for connecting with the data reader 100, 200.

Although FIG. 3 shows one block for active illumination assemblies 118, 128 in each of the vertical and horizontal housings 110, 120, some embodiments may include multiple such assemblies in each of the horizontal and vertical housings 110, 120 in order to provide for different lighting options at different angles across the read zone. For example, the vertical housing 110 may include two (or more) illumination assemblies therein at different locations and/or different colors for a desired illumination field from the vertical view. Likewise, the horizontal housing 120 may include two (or more) illumination assemblies therein at different locations and/or different colors for a desired illumination field from the horizontal view. As shown herein, the illumination assemblies 118, 128 may be coupled directly to the main board 130. However, in some embodiments, additional components may be coupled within the path from the main board 130, such as a control panel or other such device. In yet other embodiments, the illumination assemblies 118, 128 may be coupled to the multi-port network switch 140 which may route triggering controls from the main board 130. TDR 152 and one or more of the peripheral cameras 154, 156 may also include associated illumination assemblies. Synchronization of such illumination sources may be managed by the multi-port network switch 140 as controlled by the main board 130. In some embodiments, the multi-port network switch may employ or leverage IEEE1588 Precision Time Protocol to synchronize the illumination system with remote cameras, which may enable clock accuracy in sub-microsecond range.

In operation, images may be captured by the cameras 112, 114, 116, 122, 124, 126. Monochrome images may be captured by monochrome cameras 112, 114, 122, 124 and color images may be captured by color cameras 116, 126. The multi-port network switch 140 may be configured to coordinate (e.g., synchronize) timing of camera exposure and active illumination (e.g., white illumination) with the color cameras 116, 126 (as controlled by the controller on the main board 130) to occur in an offset manner with the timing of the camera exposure and active illumination (e.g., red illumination) with the monochrome cameras 112, 114, 122, 124.

Image data (e.g., streaming video, image frames, etc.) from the color cameras 116, 126 may be routed through the multi-port network switch 140 to the processing/analysis modules located internal to the data reader 100, 200, such as the one or more on-board processors 135 supported by the main board 130. Similarly, from the TDR 152 and any peripheral cameras 154, 156 may be routed through the multi-port network switch 140 to the processing/analysis modules located internal to the data reader 100, 200, such as the one or more on-board processors 135 supported by the main board 130. Image data from the monochrome cameras 112, 114, 122, 124 may be sent to the processing/analysis modules internal to the data reader 100, 200 such as the one or more on-board processors 135 supported by the main board 130. If coupled directly to the main board 130, such monochrome images may be received by the main board 130 without being routed by the multi-port network switch 140.

Some analysis may be performed by the system processor 136, such as decoding indicia (e.g., 1D barcodes, 2D barcodes, watermarking, OCR, etc.) identified within the images. Thus, in some embodiments, barcode decoding may be performed on the monochrome images (e.g., received from the MCs 112, 114, 122, 124) and/or color images (e.g., received from the CCMs 116, 126 through switch 140) captured internally within the data reader 100, 200 by the one or more processors 135 (e.g., system processor 136) supported by the main board 130. In some embodiments, barcode decoding may be performed on the monochrome images and/or color images captured externally from the data reader 100, 200 (e.g., received from the TDR 152, peripheral cameras 154, 156 through switch 140) by the one or more processors 135 (e.g., system processor 136) supported by the main board 130.

Other analysis may be performed by the system AI accelerator 138 located on the main board 130. In some embodiments, complex analysis (e.g., AI, neural network machine learning, OCR, object recognition, item validation, produce recognition, analytics, decoding, etc.) may be offloaded to the system AI accelerator 138 located on-board the main board 130. Such image analysis may be performed locally by the system AI accelerator 138 on the color image data captured internally within the data reader 100, 200 (e.g., received from the CCMs 116, 126 through switch 140), on the monochrome image data captured internally within the data reader 100, 200 (e.g., received from the MCs 112, 114, 122, 124), and/or image data captured by external devices (e.g., received from the TDR 152, peripheral cameras 154, 156 through switch 140).

The results of such analysis by the system AI accelerator 138 may be transmitted to the system processor 136 for further analysis in some embodiments. The system processor 136 may analyze such results to control certain features, such as generate alerts, trigger additional image capturing, perform analytics, or perform other system actions (e.g., forward results to POS system 160). The results of such analysis by the system AI accelerator 138 may be transmitted via the multi-port network switch 140 to the remote server 158 for further analysis in some embodiments. The remote server 158 may likewise perform analysis on such results generated by the system AI accelerator 138 located on-board the main board of the data reader 100, 200.

Image data from the color cameras 116, 126 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on the color images externally to the data reader 100, 200 by external devices coupled through the multi-port network switch 140. Such color images or other data stream may be routed directly to the network connected external devices through the multi-port network switch 140 without first being received by the main board 130 (if at all). In other words, image data may be communicated (e.g., passed) from at least one imager internal to the data reader through the at least one multi-port network device 140 and on to at least one external device bypassing the main board 130. Having a connection to both the main board 130 as well as to external devices via the multi-port network switch 140 enables image data to be provided to internal as well as external processing resources.

Image data from the monochrome cameras 112, 114, 122, 124 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on the monochrome images externally to the data reader 100, 200 by external devices coupled through the multi-port network switch 140. Such monochrome images or other data stream may be routed to the network connected external devices to the multi-port network switch 140 after first being received by the main board 130.

Image data from the TDR 152 or other external peripheral cameras 154, 156 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on these images externally to the data reader 100, 200 by external devices coupled through the multi-port network switch 140. Such images or other data stream may be routed directly to the network connected external devices through the multi-port network switch 140 without first being received by the main board 130 (if at all).

The multi-port network switch 140 may be coupled to the main board 130 via a single cable configured to provide power and communication to the main board 130. Power may be provided to the system via power source 150 via the multi-port network switch 140, which in turn provides power (e.g., power over ethernet (PoE)) to the main board 130 and the color cameras 116, 126. Monochrome cameras 112, 114, 122, 124 and illumination assemblies 118, 128 may be powered via the main board 130.

Features of employing the multi-port network switch 140 as a primary backbone for communication and power to interface between both internal and external components of the system include enabling power, communications, and camera/illumination synchronization to occur over a single cable between such connected components. In addition, precision time protocol (PTP), generic precision time protocol (GPTP), time sensitive networking (TSN) may provide an improved synchronization (e.g., within 1 microsecond error) for an open standard, widely supported, single cable solution. In addition, scanner maintenance tools may be simplified via improved network connectivity.

In some embodiments, the multi-port network switch 140 may be disposed within an external module having its own housing separate from the data reader 100. The multi-port network switch 140 may, thus, be located outside of the bioptic housing of the data reader 100 but may operably couple to the main board 130 and internal devices (e.g., vertical CCM 116, horizontal CCM 126) as well other external devices (e.g., TDR 152, cameras 154, 156, server 158, etc.) for providing the network backbone for communication and/or power as described above.

Figure 4:
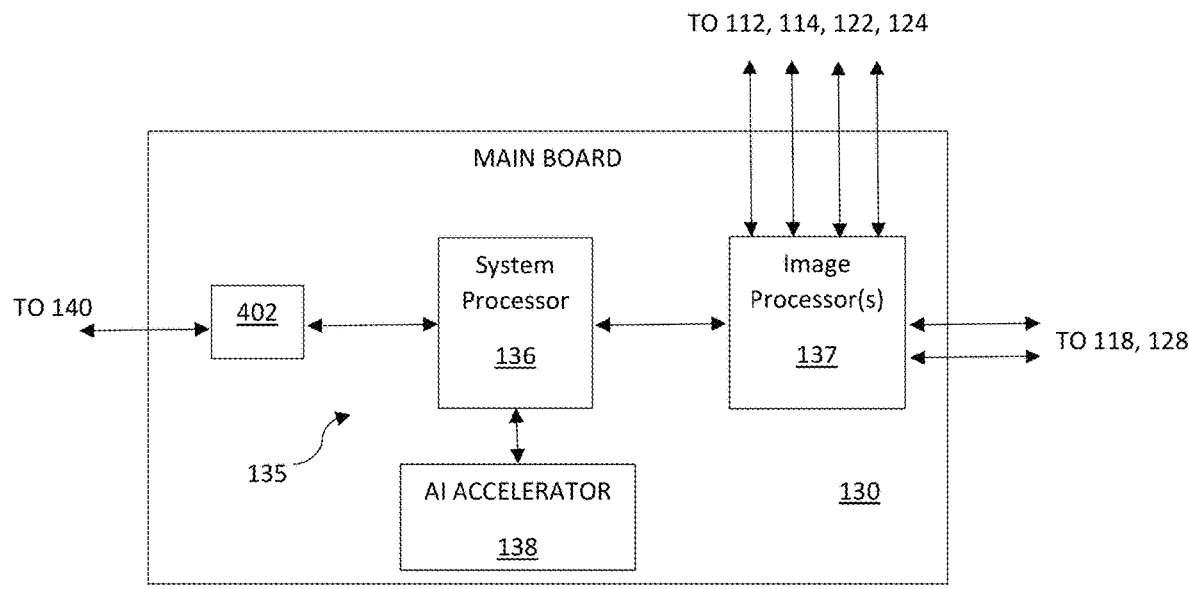
FIG. 4 is a simplified block diagram of certain components mounted on the main board according to an embodiment of the disclosure.

FIG. 4 is a simplified block diagram of certain components mounted on the main board 130 according to an embodiment of the disclosure. In particular, further details are provided regarding the one or more processors 135, which may include an Ethernet physical layer 402, a system processor 136, an image processor 137, and a system AI accelerator 138. The system processor 136 may be coupled to each of the Ethernet physical layer 402, the image processor 137, and the system AI accelerator 138. The Ethernet physical layer 402 coupled with the multi-port network switch 140 to provide an interface between the main board 130 and the multi-port network switch 140. The image processor 137 may be coupled to the monochrome imagers 112, 114, 122, 124 to provide control (e.g., sync signal) and to receive monochrome images therefrom. The image processor 137 may be configured to receive and format image data from the cameras 112, 114, 122, 124 before being received by the system processor 136. In some embodiments, multiple image processors may be present such that each camera 112, 114, 122, 124 may have its own image processor associated therewith. In some embodiments, cameras may share an image processor for transmission to the system processor 136. For example, a single image processor may be configured to combine (e.g., concatenate) the image data from each of the monochrome cameras 112, 114, 122, 124 for the system processor to receive multiple views at a single point in time through one input. Image processor 137 may also be coupled to the illumination assemblies 118, 128 to provide control thereto (e.g., sync signal). In some embodiments, the sync signal may be generated by one of the Ethernet physical layer 402 or the system processor 136, which may be based on a system clock signal.

Image data that may be provided to the system AI accelerator 138 may be received from the system processor 136. Such image data may be captured by devices connected to the multi-port network switch 140, such as from the color camera modules 116, 126, the TDR 152, or other peripheral cameras 154, 156. Image data may also be received by the system AI accelerator 138 that is captured by devices connected to the main board that bypass the multi-port network switch 140, such as from the monochrome camera modules 112, 114, 122, 126. The system processor 136 may perform some pre-processing on the image data prior to transmitting to the system AI accelerator 138, such as pre-processing the raw image data, extracting metadata, histogram data, generating descriptor data, etc.

Figure 6:
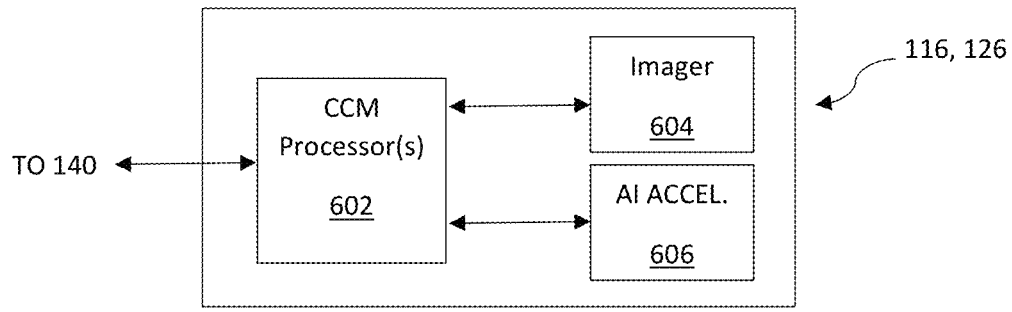
FIGS. 6-8 are different simplified block diagrams of the various imager modules according to an embodiment of the disclosure.
Figure 7:
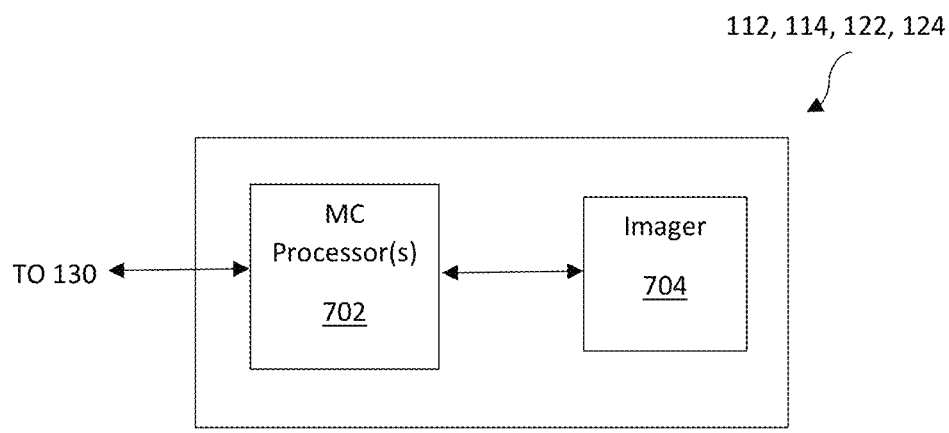
Figure 8:
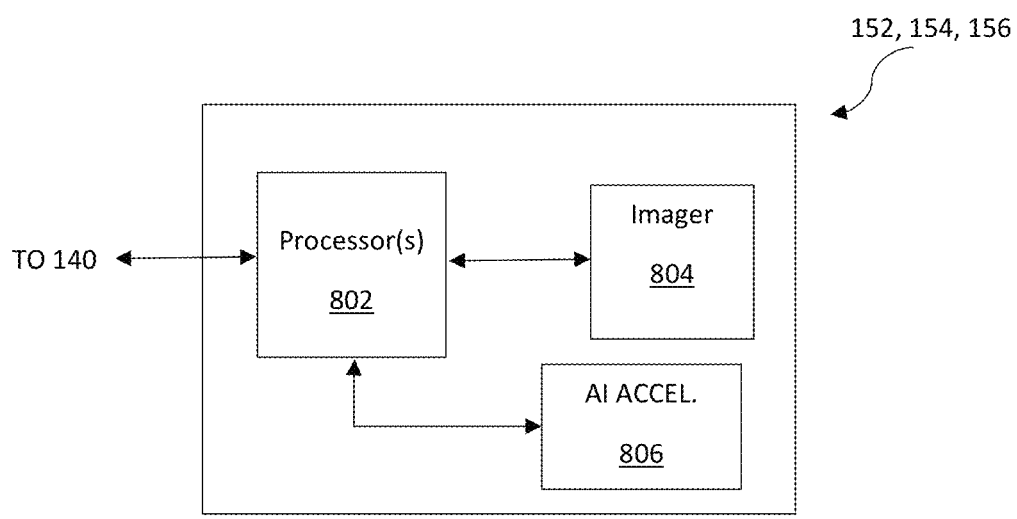

FIGS. 6-8 are different simplified block diagrams of the various imager modules according to an embodiment of the disclosure. For example, FIG. 6 may refer to one of the color camera modules 116, 126, FIG. 7 may refer to one of the monochrome camera modules 112, 114, 122, 124, and FIG. 8 may refer to one of the TDR 152 or peripheral cameras 154, 156 as examples. At least some of these camera modules may include their own on-board AI accelerator that may be included with other on-board components and processors. Examples are provided in which the color camera modules, TDR, or peripherals may include an on-board AI accelerator separate from that located on the main board, whereas the monochrome cameras do not include an AI accelerator. It is contemplated that monochrome cameras may include an AI accelerator while other camera modules do not.

Referring to FIG. 6, the color camera module 116, 126 may include a CCM processor 602 that couples to a color imager 604 and to the multi-port network switch 140. The CCM processor 602 may include one or more processors that perform different functions, such as control, formatting, and/or certain analysis functionality, etc. Active illumination for the color camera module 116, 126 may occur off-board via separate illumination assemblies 118, 128. In some embodiments, separate on-board processors may not be present for one or more of the CCM modules 116, 126 such that the control for such separate on-board processors may be directly from the main board (e.g., system processor 404) and/or via the multi-port network switch 140 rather than with its own CCM processor 602.

In some embodiments, the color camera module 116, 126 may also include an AI accelerator 606 on-board the color camera module 116, 126. In some embodiments, the AI accelerator 606 may be surface mounted directly on the PCB of the color camera module 116, 126 along with the CCM processor 602 and the imager 604. The AI accelerator 606 of the color camera module 116, 126 may perform similar operations as described herein regarding the system AI accelerator 138 of the main board 130. Having the AI accelerator 506 directly on-board with CCM processor 502 may provide latency advantages.

Referring to FIG. 7, the monochrome camera module 112, 114, 122, 124 may include a MC processor 702 that couples to a monochrome imager 704 and to the main board 130 directly. However, it is also contemplated that the monochrome imagers 704 may be connected to the multi-port network switch 140. The MC processor 702 may include one or more processors that perform different functions, such as control, formatting, and/or certain analysis functionality, etc. Active illumination for the MC camera module 112, 114, 122, 124 may occur off-board via separate illumination assemblies 118, 128. In some embodiments, separate on-board processors may not be present for one or more of the MC camera modules 112, 114, 122, 124 such that the control for such may be directly from the main board (e.g., system processor 404 and/or image processor 406) rather than its own MC processor 702.

Referring to FIG. 8, the TDR 152 or other peripheral cameras 154, 156 may include a processor 702 that couples to an imager 704 (e.g., color and/or monochrome depending on application) and to the multi-port network switch 140. The processor 702 may include one or more processors that perform different functions, such as control, formatting, and/or certain analysis functionality, etc. In some embodiments, certain camera modules (e.g., TDR 152 or other peripheral cameras 154, 156) may have their own active illumination assembly (not shown) associated therewith that may different than the illumination assemblies 118, 128 within the bi-optic housing. The illumination assembly may be located on-board as shown or provided at a separate location which may still be within the camera module housing. In some embodiments, separate on-board processors may not be present for the TDR 152 such that the control for such may be directly from the main board (e.g., system processor 404) and/or via multi-port network switch 140 rather than with its own TDR processor 702.

In some embodiments, the TDR 152 or other peripheral cameras 154, 156 may also include an AI accelerator 706 on-board the color camera module 116, 126. In some embodiments, the AI accelerator 706 may be surface mounted directly on the PCB of the color camera module along with the processor 702 and the imager 704. The AI accelerator 706 of the camera module may perform similar operations as described herein regarding the system AI accelerator 138 of the main board 130. Having the AI accelerator 706 directly on-board with CCM processor 702 may provide certain latency advantages.

Various AI or other processing operations may be implemented by the system processor 136, system AI accelerator 138, and/or the remote server 158 according to embodiments of the disclosure. Similarly, certain AI or other processing operations may be implemented by on-board camera processors, such as CCM processor 602 (FIG. 6), MC processor 702 (FIG. 7), processors 802 (FIG. 8), and/or on-board camera AI accelerators 606 (FIG. 6), 806 (FIG. 8) for cameras having such functionality. AI operations may thus be performed by different AI accelerators having different AI models distributed throughout the data reader 100, 200 and the related system. Embodiments of the disclosure may leverage such distributed AI accelerators to provide increased flexibility for local AI solutions.

Figure 9:
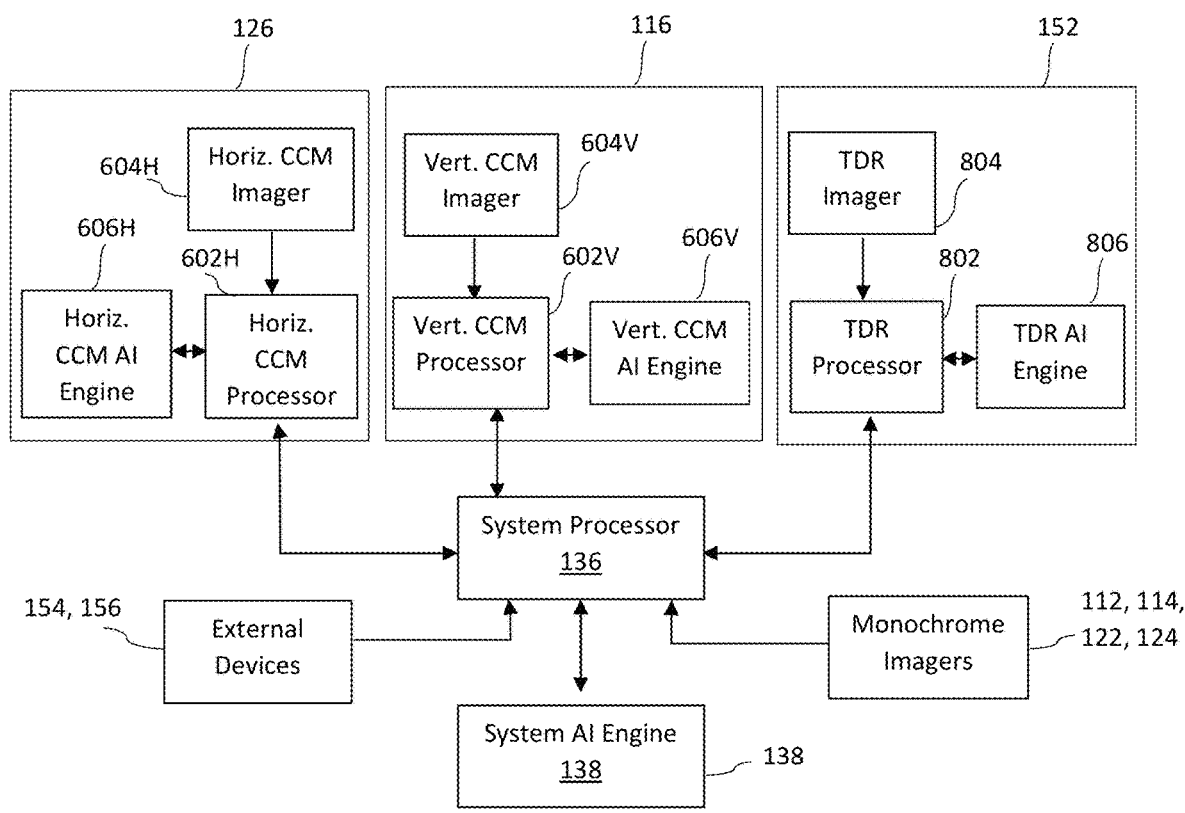
FIG. 9 is a simplified block diagram showing the distributed AI acceleration resources available in the system architecture of a data reader or data reading system along with the data flow between such system components.

FIG. 9 is a simplified block diagram showing the distributed AI acceleration resources available within the system architecture of a data reader or data reading system along with the data flow between such system components. As described above, the system processor 136 may be coupled to the various components (e.g., CCMs 116, 126, TDR 152, external devices 154, 156, monochrome imagers 112, 114, 122, 124, system AI engine 138) to manage data flow and control of the system. Other components, such as the multi-port network switch 140, illumination, POS, power source, remove server, etc. are not shown in FIG. 9 for simplicity of description. As described above, CCMs 116, 126 (e.g., located in the horizontal and vertical portion of the bi-optic data reader) may each include an onboard AI engine 606 coupled to a CCM processor 602 that manages data flow from the CCM imager 604. As shown in FIG. 9, the components of the vertical CCM 116 have an additional notation of "V" following the reference numeral denoting being part of the vertical CCM 116, and the components of the horizontal CCM 126 have an additional notation of "H" denoting being part of the horizontal CCM 126. The TDR 152 may also include an onboard AI engine 806 coupled to a TDR processor 802 that manages data flow from the TDR imager 804.

As described above, the system AI engine 138 may also be coupled to the system processor 136. The system AI engine 138 may have more processing power and can handle more AI complexity than the onboard imager AI engines 606H, 606V, 806. In some embodiments, additional AI engines, such as one or more additional system AI engines may be included. Each system AI engine which may be coupled to the main-board as described above (e.g., via a PCIe connection). As a result, the various embodiments local AI resources may be distributed among different components and having different capabilities.

Each individual AI engine may execute one or more trained AI models that are configured to perform specialized AI tasks (e.g., produce recognition, item identification, item validation, barcode switching, sticker identification, object tracking, etc.) In some embodiments, trained AI models may be stored in non-volatile memory on-board with the respective AI engine. For example, non-volatile memory (not shown) may be mounted on-board within the horizontal CCM 126 along with the horizontal imager AI engine 606H such that the non-volatile memory stores the trained AI model(s) accessible by the horizontal imager AI engine 606H. The trained AI model(s) may be loaded (e.g., during power up, based on system requests, etc.) into volatile memory (not shown) for the horizontal imager AI engine 606H for execution of the particular AI task(s). Similarly, the vertical CCM 116 may include non-volatile memory mounted on-board with the vertical imager AI engine 606V such that the non-volatile memory stores the trained AI model(s) accessible by the vertical imager AI engine 606H and loaded into volatile memory for the vertical imager AI engine 606V to execute desired AI tasks. The TDR 152 may include non-volatile memory mounted on-board with the TDR AI engine 806 such that the non-volatile memory stores the trained AI model(s) accessible by the TDR AI engine 806 and loaded into volatile memory for the TDR AI engine 806 to execute desired AI tasks. Other imager modules with AI engines may be configured similarly.

Figure 10:
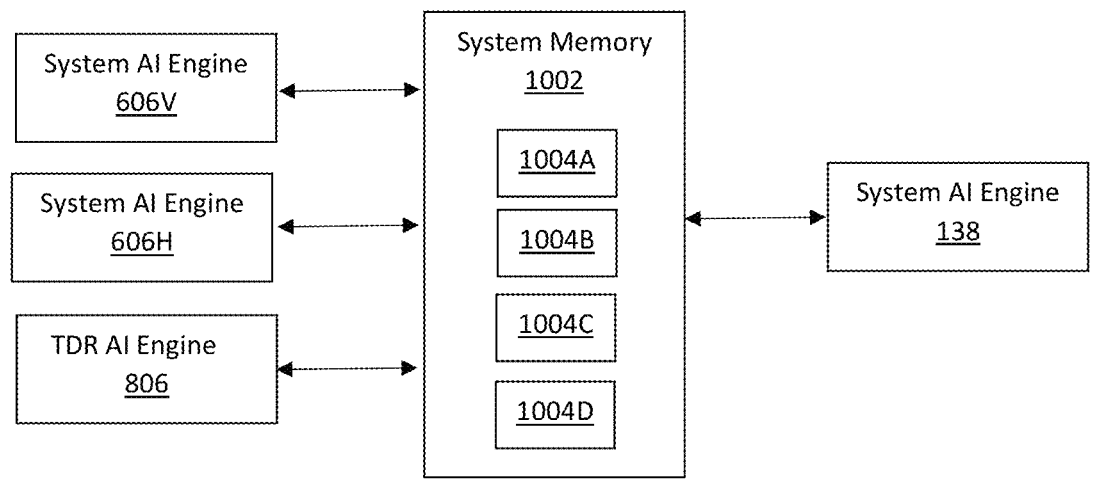
FIG. 10 is a simplified block diagram showing the distributed AI acceleration resources operably coupled with a system memory may include a repository of trained AI models available to the different AI engines.

In some embodiments, the system memory may include a repository of trained AI models available to the different AI engines. For example, as shown in FIG. 10, system memory 1002 may have a plurality of trained AI models 1004A-1004D stored therein. Each of the AI engines 138, 606V, 606H, 806 (and any others) may be coupled to the system memory 1002 (e.g., directly or indirectly, such as via system processor 136) in order to access one or more of the different AI models 1004A-1004D. The AI engines 138, 606V, 606H, 806 may access the system memory 1002 to load one or more of the AI models 1004A-1004D into volatile memory for operation. In some embodiments, an AI engine may have enough volatile memory to load more than one AI model depending on the memory capacity and the size of each AI model. Once loaded into volatile memory, the AI engine may execute AI tasks using the one or more AI models. AI model(s) may be loaded at power up and/or in response to certain requests, such as scheduling requests from an imager processor and/or system processor 136. In some embodiments, the AI engine may load a new AI model into volatile memory that replaces (e.g., overwrites) a currently loaded AI model for one or more AI tasks as desired.

In some embodiments, the different AI models 1004A-1004D may be different categorical types. For example, a first AI model 1004A may be trained specifically for produce recognition, a second AI model 1004B may be trained specifically for object detection, a third AI model 1004C may be trained specifically for item validation (e.g., does the barcode match the object detection), and a fourth AI model 1004D may be trained specifically for object tracking. These categorical types are intended as examples, and others are contemplated instead of, or in addition to, those described herein. As a more particular example, different AI models may be suited for a particular AI engine. For example, a produce recognition AI model may be loaded for execution by the TDR AI engine 806, while the vertical and horizontal AI engines 606V, 606H may be configured to load and execute AI models for item identification and item validation, and the system AI engine 138 may be configured to load and execute AI models for barcode switching and/or user tracking. For embodiments that include one or more additional system AI engine, each such AI engine may be configured to load an execute a different AI model than the others such that the AI model is scalable as new features are developed and added for the system. Any combination or distribution of such AI models among the different AI engines 138, 606V, 606H, 806, etc. are contemplated.

In some embodiments, the different AI models 1004A-1004D may be of the same categorical types. For example, the first AI model 1004A and the second AI model 1004B may both be specifically trained for object detection but in different ways. In some embodiments, the AI models 1004A, 1004B of the same categorical type may differ in that one is more appropriate for a first field-of-view and the other is more appropriate for a second field-of-view. Thus, the first AI model 1004A may be loaded and utilized by one of the AI engines in the analysis of image data captured by a first camera, while the second AI model 1004A may be loaded and utilized by one of the AI engines in the analysis of image data captured by a second camera. In some embodiments, the first AI model 1004A and the second AI model 1004B may be identical to start out during operation but over time may be fine-tuned for each field-of-view with updated training.

In some embodiments, AI models of the same categorical type may have differing levels of complexity—such as requiring different sets of input data, achieving different confidence levels, different processing requirements, speeds, etc. As a result, different AI models may be executed by different AI engines such that the capabilities of each AI engine may not necessarily be the same even if the categorical type is the same. For example, each of the individual AI engines 606V, 606H, 806, 138 may load and execute one or more AI models that are the same or similar capabilities as the others within the system. In some embodiments, some AI engines may include a first model type having a first complexity, and another AI engine may include the first model type but with a second complexity. As an example, a lower complexity AI model may be more appropriate for one of the on-board imager AI engines (e.g., 606V, 606H, 806, etc.) and the higher complexity AI model of the same categorical type may be more appropriate for the system AI engine 138 another system level AI engine, if present.

In some embodiments, AI engines 606V, 606H, 806 may have overlapping model types or other AI capabilities such that different AI tasks may be handled by any available AI engine with sufficient capabilities. For example, the imager AI engines 606V, 606H, 806 may include a produce recognition AI model having a first complexity, and the system AI engine 138 may include a produce recognition AI model having a second complexity that is greater than the first complexity. For example, the produce recognition AI model for the system AI engine 138 may handle more inputs, offer higher processing resources, provide higher confidence results, etc. than the produce recognition AI models for the imager AI engines 606V, 606H, 806.

Some embodiments may include different combinations of components (e.g., vertical CCM 116 may be present while horizontal CCM 126 may not, TDR 152 may be present with CCMs 116, 126 not being present, or any such combination of one, two, or any number of such camera modules). Likewise, different combinations of AI engines are contemplated (e.g., system AI engine 138 may be present or not be present while one or more imager AI engines 606V, 606H, 806 may be present or absent, or any such combinations). Likewise, although the monochrome imagers 112, 114, 122, 124 and the external devices 154, 156 are not shown in FIG. 9 as including an on-board AI engine, embodiments of the disclosure contemplate such inclusion and any combination thereof with the other AI engines described herein. As AI engines are added or removed from the data reader, the system processor 136 may detect their presence or absence and adjust system AI operation requests accordingly. In some embodiments, one or more local on-board AI accelerators may be permanently soldered to their respective board, while others may be configured as replaceable cards may be added or upgraded (e.g., via PCIe) to add additional capabilities. Such cards may include one or multiple AI accelerator chips available for AI processing. Some data readers may not have all AI acceleration options at available at a given time that are supportable by the system, and embodiments of the disclosure may adjust to offer flexible AI functionality for whatever AI resources and capabilities are present.

The system processor 136 may be configured as a scheduler/dispatcher to coordinate AI acceleration resources of image data (e.g., raw images, processed images, descriptor data, histogram data, etc.) across a variety of local AI engines available to the data reader. To accomplish this coordination, the system processor 136 may maintain a dynamic task schedule (e.g., queue) for each AI engine throughout the system. In some embodiments, certain AI engines may be configured for specialized tasks such that not all AI engines may be able to handle a particular request from the system processor 136. For example, the imager AI engines 606H, 606V, 806 may load AI models configured to perform different AI acceleration tasks than the system AI engine 138. In some embodiments, the system AI engine 138 may load AI model(s) configured to perform any AI acceleration task that can be performed by the imager AI engines 606H, 606V, 806, as well as additional AI acceleration tasks.

The system processor 136 may maintain a directory of the capabilities (e.g., loaded AI models or available AI models to be loaded) for each AI engine currently online within the system and update the directory if any such AI engine is added, removed, or otherwise modified to change its capabilities. AI tasks may be initiated by the system processor 136 and assigned to an appropriate AI engine based on the task requirements. The decision to assign a particular task to a particular AI engine may also be based on current availability, processing requirements, latency requirements, the origin of the required image data, type of AI task, or other factors. In some embodiments, the imager AI engines (e.g., 606H, 606V, 806) within a particular imager module (e.g., 116, 126, 152) may be assigned tasks related to the image data from the respective imager module without having the task request being received by the system processor 136 or without constantly requiring approval from the system processor 136. In such an embodiment, the respective imager processor (e.g., 602H, 602V, 802) may automatically assign the task using the image data from the respective module and then inform the system processor 136 of the AI task being performed so that the system processor 136 is aware of the current task being performed. Each imager processor 602H, 602V, 802 may also maintain its own dynamic task schedule for the respective imager AI engine by queueing its own requests along with any others received from the system processor 136.

In some embodiments, such as when all AI acceleration resources shown in FIG. 9 are available, the Horizontal CCM AI engine 606H may service AI task requests involving the image data received from the horizontal CCM 126, the Vertical CCM AI engine 606V may service AI task requests involving the image data received from the vertical CCM 116, and the TDR AI engine 806 may service AI task requests involving the image data received from the TDR 152 in terms of AI acceleration tasks. Image data may also be transmitted to the system processor 136 for additional processing and analysis (e.g., decoding, etc.) using the resources of the system processor 136 and/or further routed to the system AI engine 138 and/or remote devices for additional processing needs. The local AI acceleration tasks performed by the CCM AI engines 606H, 606V and the TDR AI engine 806 for the image data from their respective module may be performed before and/or currently with the additional processing that may be performed on the image data by the system processor 136, the system AI engine 138, and/or other devices. For AI acceleration tasks on the image data originating within its respective module, the task may occur automatically without being specifically assigned by the system processor 136. The module (e.g., CCMs 116, 126, TDR 152) may communicate with the system processor 136 to inform the system processor 136 of the task so that the system processor 136 may maintain a running schedule of all AI tasks being performed within the data reader.

Some AI tasks may require image data originating from different imager modules. In some embodiments, such data fusion from different sources may be best handled by the system AI engine 138 with its higher processing power and potential for more complex AI models. Such additional data may originate from those modules (e.g., CCMs 116, 126, TDR 152) that have their own local AI engines as well as those modules (e.g., monochrome imagers 112, 114, 122, 124, external devices 154, 146) that do not have their own local AI engines. Thus, AI tasks may be performed on any image data from any source regardless of whether the particular module has its own local AI engine. Some AI tasks may also be improved with additional non-image data from other sources, including weight data from the scale, and other non-image sensor data. In such embodiments, the system processor 136 may determine which AI engine may be available that has the appropriate AI model and processing capabilities to service a particular AI request within the task requirements and initiate the request accordingly. In some cases, the AI request may be assigned to the system AI engine 138, while depending on the current usage and/or availability of the different AI resources, or based on the particular AI task to be performed, the system processor 138 may determine that one of the other available AI engines 606H, 606V, 806 may be used for the analysis. Thus, the system processor 138 may behave differently depending on which AI engines are available and/or the source of image data used in the analysis.

For example, the system processor 136 may generally favor using the system AI engine 138 for AI co-processing on the monochrome image data (e.g., because of the latency caused by data flowing between more devices or because of the capabilities of each AI accelerator). But when the system AI engine 138 is not available (e.g., because of other processing tasks or because the system AI engine 138 is not present in the system at all), then the system processor 136 may determine if the AI task may be handled by one of the local on-board AI engines associated with one of the other imager modules. If so, the task may be sent to the available AI engine accordingly for analysis.

As described above, when AI tasks are scheduled and assigned by the system processor 136 to one of the AI engines, the system processor 136 may determine what resources are available that can handle a particular task. For example, the system processor 136 may determine which AI engines are on-line, which AI models are loaded (or may be loaded), and determine which AI engine to send the AI request based on current task and schedule requirements. If no AI engine currently has an appropriate AI model loaded, but the AI model is available in the repository of AI models, the system processor 136 may send such information with a request to a particular AI engine to load the AI model as needed to complete the AI task. When a task is completed, the particular AI engine may return a task completion message informing the system processor 136 that the task is complete so that a new task may be assigned.

Some AI tasks may also be assigned to the local on-board AI accelerators directly by the local processor of the particular module without first receiving the request from the system processor 136. For example, the TDR processor 802 may regularly assign AI tasks to the TDR AI engine 806 without first checking with the system processor 136. The TDR processor 802 may inform the system processor 802 of such a task assignment/completion so that the system processor 802 may be aware when the TDR AI engine 806 may be available for system AI tasks. The TDR processor 802 may also maintain a queue of AI tasks such that higher priority tasks from the system processor 136 may be handled more quickly than local tasks on TDR data determined solely by the TDR processor 802. Other local device processors (e.g., CCM processors 602V, 602H) may initiate tasks similarly on their own data without constantly requiring approval from the system processor 136 (but informing the system processor 136) and by queueing other requests from the system processor 136 as needed.

In some embodiments, AI tasks may be assigned a priority by the system processor 136 when managing the dynamic schedule of AI tasks across the distributed AI engines throughout the device. Some AI tasks may have higher priority as they may relate to real-time processing that needs to be completed for a particular transaction. Higher priority tasks can be placed higher in the queue for sending to an available AI engine. Some tasks, such as object detection may have higher priority where results may need to be provided in near real time with minimal delay. Other tasks may have lower priority, such as produce recognition where the produce item typically remains within the field-of-view for a longer period of time while the produce item is weighed. Some additional latency may be acceptable compared to other higher priority tasks.

If no current AI engine is available that can handle the task, the system processor 136 may consult the priority of those tasks currently in process and can send the request to an appropriate AI engine which may temporarily pause its current task (if lower priority) and run the higher priority AI task to completion before resuming or restarting the prior task.

The system processor 136 may also predict when each AI engine will become available based on knowing the timing of the current task being initiated and the expected duration for that task. This information may be helpful if a different AI engine would be preferable instead of the next available one. For example, the system processor 136 may determine that an AI engine currently in use may be preferable to a currently available one even with the small delay needed to wait for that AI engine to become available instead of simply dispatching to the one currently available.

In some embodiments, the system processor 136 identify one or more triggering events that determine which AI model is to be used for a particular situation. In some embodiments, the event-based trigger may be used to determine which AI model (from among a set of available trained AI models) may be desired for a particular situation. For example, the system processor 136 may detect an item of a particular dominant color and determine that an AI model trained for objects having that particular dominant color may be most appropriate for item identification or produce recognition. In another situation, the system processor 136 may detect a particular hand movements (e.g., empty hand, finger near barcode, motion of hands, etc.) are present that should trigger use of an AI model trained for security analysis. Another triggering event may include an item being placed on a scale, and the system processor 136 may determine that an AI model should be used that utilizes weight information (e.g., produce recognition). In each of these situations (and others), such AI models may be already loaded in one or more of the local AI engines 606H, 606V, 806, 138 in which case the system processor 138 may schedule/dispatch such requests to the appropriate AI engine(s) as described herein. In some embodiments, the desired AI model may not be loaded currently in one of the local AI engines 606H, 606V, 806, 138 needed for the analysis. The system processor 138 may determine the appropriate local AI engine 606H, 606V, 806, 138 for scheduling/dispatching the request along with the needed AI model so that the AI engine receiving the request can load the AI model as needed.

Embodiments of the disclosure may also be configured to utilize each of the distributed AI accelerator architecture in an ensemble such that certain AI tasks may be performed independently within the imager AI engines on the image data from their respective module that then is resolved by the system processor 136 and/or using the system AI engine 138 to perform additional analysis before being resolved.

For example, when performing produce recognition or item recognition, each available AI engine 606H, 606V, 806 may perform AI tasks according to a trained AI model loaded therein. The AI task for each AI engine 606H, 606V, 806 may utilize the image data originating from its respective module to generate a list of possible matches to be compared to a predetermined match threshold. In some situations, each AI engine 606H, 606V, 806 may agree and have results that are above the predetermined match threshold. In other situations, the AI engines 606H, 606V, 806 may not agree and/or may generate different lists based on the likelihood of a match. In some embodiments, the system processor 136 may receive the independently generated match results and resolve situations by itself, with the assistance of the customer (e.g., via picklist generation), and/or by employing the assistance of the system AI accelerator 138 that may have a more sophisticated AI engine for item identification.

As an example, different AI engines might identify different items at different probabilities. The system processor 136 might be able to resolve most result sets from the different AI engines. However, certain situations may require a more sophisticated AI engine, such as the one executed by the system AI accelerator 138.

A first example using produce recognition is shown in Table 1:

TABLE 1

| Horizontal CCM | Vertical CCM | TDR |
| --- | --- | --- |
| Apple-98% | Apple-95% | Apple-96% |
| Tomato-84% | Tomato-62% | Tomato-68% |
| Pepper-60% | Pepper-51% | Pepper-68% |

In this example, a first confidence threshold may be set at 95%, and all three AI engines executing a produce recognition AI model have results greater than that threshold. The system processor 136 might resolve this situation without the assistance of the system AI accelerator 138 because all items are above the confidence threshold. As a result, the item may be added to the transaction list without further assistance.

A second example is shown in Table 2:

TABLE 2

| Horizontal CCM | Vertical CCM | TDR |
| --- | --- | --- |
| Apple-98% | Apple-95% | Apple-89% |
| Tomato-82% | Tomato-75% | Tomato-81% |
| Pepper-60% | Pepper-57% | Pepper-68% |

In this example, a first confidence threshold may be set at 95%, but only two AI engines have results greater than that threshold. In some embodiments, the system processor 136 may resolve this conflict situation without the assistance of the system AI accelerator 136. If the majority of results are above the confidence threshold (and the other result has that item at the top of its list or at least within a tolerance range) then the system processor 136 may add the item to the transaction list without further assistance despite the result from the TDR AI engine not being above the confidence threshold.

A third example is shown in Table 3:

TABLE 3

| Horizontal CCM | Vertical CCM | TDR |
| --- | --- | --- |
| Apple-90% | Apple-93% | Apple-89% |
| Tomato-82% | Red Pear-75% | Tomato-81% |
| Pepper-60% | Tomato-57% | Red Onion-62% |

In this example, a first confidence threshold may be set at 95%. None of the results are greater than that confidence threshold. In some embodiments, the system processor 136 might still resolve this situation without the assistance of the system AI accelerator 138, for example, if there is a clear favorite among the three items (e.g., apple). In some embodiments, if there is a clear favorite among the results and the results are within a tolerance range (or based on some other calculation) then the system processor 136 may add the item to the transaction list without further assistance despite no single result was above the confidence threshold. In other embodiments, the system processor 136 may resolve the conflict via user input by offering that one item to the customer to confirm through the touch screen interface. If the user does not confirm the selection, then a second list (e.g., picklist) with more options may then be provided for the customer to select from through the touch screen interface or otherwise search for the item.

When generating a picklist, the results of each AI engine may be considered. The picklist may be created based on a second threshold that is referred to in this example as the "picklist threshold." The picklist may include all items that are above the picklist threshold of any one of the views or some other criteria. For example, the picklist threshold may be set at 60%. As a result, the generated picklist may include:

1) Apple (based on all three AI engines)

2) Tomato (based on horizontal CCM, TDR)

3) Pepper (based on horizontal CCM)

4) Red Pear (based on vertical CCM)

5) Red Onion (based on TDR)

The device that included the item provided to the picklist is shown in parenthesis as an example. The order on the picklist may be based on the confidence levels (e.g., highest, averaged, weighted, etc.) from each AI engine.

A fourth example is shown in Table 4:

TABLE 4

| Horizontal CCM | Vertical CCM | TDR |
|---|---|---|
| Apple-93% | Tomato-85% | Apple-89% |
| Tomato-82% | Apple-81% | Tomato-81% |
| Pepper-60% | Pepper-60% | Pepper-68% |

In this example, a first confidence threshold may be set at 95%. None of the results are greater than that confidence threshold. In addition, it is noted one AI engine yielded a top result that is different than the other results of the other two AI engines. The system processor 136 might still resolve this situation without the assistance of the system AI accelerator 138, for example, by creating a picklist as described above (e.g., populating the picklist with results from any AI engine that are greater than a picklist threshold).

In some embodiments, the system AI engine 138 may be involved in any of these situations as determined by the system processor 138. The system AI engine 138 may be able to execute more complex and robust AI models than the other AI engines. As an example, the system AI engine 138 may receive as inputs the image data (e.g., descriptors—or other representations of the network inner layers) related to each of the different imager paths as well as the results from each of the local imager AI engines. In some embodiments, the system processor 136 may then combine all relevant data for the system AI engine 138 (e.g., peripheral descriptors, original raw or processed images from each imager module, voting results from each imager AI engine, and any combination thereof) to send to the system AI engine 138. Additional data from the data reader may also be included that was not considered by the imager AI engines, such as stable weight data, EAS tag data, barcode data, etc.) The system AI engine 138 may then determine a more accurate classification using the system AI engine 138 when available (as an inference engine for the ensemble model). In some embodiments, the system processor 136 may execute the ensemble analysis (even if simplified) if the system AI engine 138 is not present or available within the system.

In some embodiments, a picklist may be generated by the system processor 136 with a clear preference, especially if that result came from the System AI accelerator. The system processor 136 may display a single match on a two out of three vote for confirmation by the user, especially if one of the two votes was from the system AI engine 138 and the confidence levels were sufficiently high.

Because the system AI engine 138 may be a more complex and robust AI engine able to execute more complex and robust AI models (and with potentially more data to work with when combined with the data set from the system processor 136), the system AI engine 138 may have a different confidence threshold than the first confidence threshold used for the initial analysis performed by the local imager AI engines. If all AI engines 606H, 606V, 806 have similar AI models, but the system AI engine 138 is more complex (e.g., more refined, accurate, better, etc.), the system processor 136 may provide a "bonus" to the results of the system AI engine 138 in terms of its confidence level compared to the others, so that it would have more weight in resolving any conflicts.

Similarly, the system processor 136 may also give bonuses or demerits to the results from each AI engine based on image quality or other factors. For example, if one of the AI accelerator's results is based on image data being determined to have relatively low image quality (e.g., below a predetermined quality metric), whereas another AI accelerator's results may be based on image data being determined to have relatively high image quality (e.g., above a predetermined quality metric), then a bonus or other adjustment may be given to the AI accelerator's results with the high image quality and/or demerit the AI accelerator's results with the relatively low image quality. That is, in the case of a confidence result being based on image data having a low image quality, its confidence result may be artificially reduced from its original value. In the case of a confidence result being based on image data having a high image quality, its confidence result may be artificially increased from its original value. As a result, higher quality image data may be weighted greater than lower quality image data when resolving conflicts. Image quality may be determined, for example, by the system processor 136 (or other processor analyzing the image data used in the analysis) based on factors, such as a modulation transfer function (MTF), analyzing histogram parameters, number of features used to make an inference, and combinations thereof. As an example, MTF may a useful indicator for image focus. Histogram data may be a useful indicator of proper illumination and color contrast vs. a dark or washed out image. Larger number of features points (e.g., 130) used to make the inference may be indicative of a higher quality image than a smaller number of feature points (e.g., 5) used to make the inference. In some embodiments, results from the same imager may also be a useful indicator of image quality. For example, if the image data from one imager is consistently giving similar results without much differentiation (e.g., 54%, 53%, 52%, etc.), it may be an indication that the image quality from that imager is low and the results may be reduced further and/or discarded when resolving conflicts. If, however, the image data from another imager is providing results with proper differentiation (e.g., 80%, 30%), it may be an indication that the image quality from that image is sufficiently high to provide reliable results. As a result, the results from its image data may be increased or otherwise receiving a higher weight when resolving conflicts.

In some embodiments, each AI engine may yield results for a top-N classification as well as top-N item identification confidence results. The system processor 136 may collect and ensemble the classification and confidence results for item identification to determine a final result. Conflict resolution and weighting of different results from different AI engines may be performed as described elsewhere herein.

In some embodiments, a different parts of a trained AI model may be loaded on different AI engines such that the AI model is partially evaluated by one AI engine for completion by another AI engine. Partial results from the first part of the AI model may be collected and moved to another AI engine having the second part of the AI model loaded such that the second AI engine may complete the final inference (e.g., possibly also in combination with other outputs or partial outputs from other AI engines). For example, referring to FIG. 9, a first part of a first AI model may be loaded by the vertical CCM AI engine 606V, and a second part of the AI model may be loaded by the horizontal CCM AI engine 606H. An AI task request may be initiated at the vertical CCN AI engine 606V to begin execution of the first part of the AI model to generate a first partial result that is returned to the system processor 136. The system processor 136 may transmit the first partial result (along with other partial results from other AI engines) to the horizontal CCM AI engine 606H to begin execution of the second part of the AI model to generate a further result, such as a final result, or in some embodiments as another intermediate result to pass onto another AI engine executing another part of the AI model. These AI engines are referred to as an example, and any AI engines may be used in combination with any other to perform all or part of an AI task on different parts of an AI model with the system processor 136 collecting partial outputs for transmitting to a selected AI engine with the next stage of the AI model loaded thereon—ultimately resulting in a final stage generating the final inference.

In some embodiments, the AI models could be used as a hierarchy of models. For example, each of the imager AI engines may include AI models to resolve the image data into a large list, and the system AI engine may include an AI model that is more constrained and trained to differentiate amongst those choices. For example, if there are 200 possible fruits to identify, the imager AI engines may have models that are able to exclude 180 of the possible fruits such that the system AI engine 138 may achieve a higher confidence level by looking at targeted features and limiting its analysis to only the 20 results from the imager AI engines.

In some embodiments, the imager AI engines 606H, 606V, 806 may be tuned to do more of an approximate identification rather than sending actual potential results. For example, the results from the imager AI engines 606H, 606V, 806 may be more general, such as by an object type with a dominant color (e.g., green fruit, red bottle, orange box, yellow bag, etc.) or general dimensions (e.g., volume), which can be sent by the system processor 136 to the system AI engine 138. The system AI engine 138 may then load a more appropriate AI model from the trained AI model repository that may be determined based on the results and additional data provided by the system processor 136 to achieve a higher precision or confidence level. After resolving the matter, the system AI accelerator 138 may provide feedback to system processor 136 and/or remote systems to update and/or improve the AI models used by the local imager AI engines 606H, 606V, 806.

Embodiments of the disclosure may also include updating AI models on each AI engine 606H, 606V, 806, 138. Updating the AI models may be performed by the system processor 136 and/or an external host. As described above, the system processor 136 may resolve conflicts in the results of the different AI models associated with each imager. The resolution may be refined, in part, additional data, such as user input (e.g., picklist selection) or sensor data (e.g., weight information, EAS tag information, etc.), and/or may receive additional assistance from analysis by the system AI accelerator 138 which may perform its analysis from the results of the imager AI engines, image data, etc. (and which may provide its results/feedback to the system processor 136). In some embodiments, external feedback may also be provided for assisting model updates, such as backroom inspection of an image sequence and/or using an external service in the cloud that provides such updates.

As an example, the AI models for the imager AI engines 606H, 606V, 806 may be updated after the system AI engine 138 refines the ensemble results and/or the system processor 136 resolves any conflicts from between the different AI engine outputs. As a result, the AI models for the imager AI engines 606H, 606V, 806 may be configured for continual learning using the results of the ensemble analysis by the AI accelerator engine 138, the system processor 136, and/or any user input to update the local AI models within the imager AI engines 606H, 606V, 806.

The system processor 136 may consider all relevant data and results from each of the different AI accelerators 606H, 606V, 806 for providing model updates to the upstream models based on fresh and reliable data. The AI model updates may run in the background of the system processor 136 and/or provide update data to a remote host (e.g., store server) as a batch for additional analysis or confirmation to improve the reliability of the updates. Updates may then be provided, such as by providing descriptor data and target values that may be added to their existing model for improved performance.

In some embodiments, different models may be associated with different camera views. The system processor 136 may have received the results of the initial AI paths and determined that one path in particular was way off in its results or confidence levels. In certain situations, only one AI model (e.g., Horizontal CCM AI engine) may need to be updated whereas the other AI models (e.g., vertical CCM/TDR AI engines) may not be updated for a given instance. Over time, even if each imager AI engine may start out using copies of the same AI model, different AI models may evolve to be fine-tuned rather than always being a copy of each other improving the overall performance. Although produce recognition is used as an example of an AI model used in such an ensemble/continual learning methodology, other AI models may be distributed throughout the system similarly for coordination with other AI engines and their results.

In some embodiments, the descriptors resulting from a feature extractor of one or more of the AI models may be fed into a classifier for classification of the item. Such descriptors may be associated with the classification results for model updates of one or more AI models. The association may be further confirmed via interactions with the user in some embodiments. Such descriptors (e.g., those input into the classifier) along with their associated classification results may be used to provide updates to the one or more local AI models and/or remote AI models (e.g., cloud-based models), and in particular the classifier portion of the AI models. These updates may be performed in real-time in some embodiments. In some embodiments, the descriptors and/or classification results may be stored locally in memory (e.g., system memory on the main board or other memory accessible to the system processor and/or AI engines) such that the data used for such updates may be provided in batches according to a pre-defined criteria (e.g., daily, weekly, after a predetermined number of scans, etc.)

Additional non-limiting embodiments include:

Embodiment 1: A fixed retail scanner including a data reader, comprising: a main board including one or more processors including a system processor disposed within the data reader; one or more camera modules disposed within the data reader and operably coupled with the system processor, each camera module including a local on-board imager AI engine configured to perform AI tasks according to a loaded trained AI model; and a system artificial intelligence (AI) engine disposed within the data reader and configured to perform AI tasks according to a loaded trained AI model, wherein the system processor is operably coupled to each of the imager AI engines and the system AI engine for scheduling and dispatching AI tasks across a distributed network of AI resources including the imager AI engines and the system AI engine.

Embodiment 2. The fixed retail scanner of Embodiment 1, wherein the data reader is a bi-optic scanner having a horizontal housing and a vertical housing disposed in an orthogonal arrangement.

Embodiment 3. The fixed retail scanner of Embodiment 1, wherein the system processor is configured to receive results from each of the imager AI engines and resolve conflicts from the results.

Embodiment 4. The fixed retail scanner of Embodiment 3, wherein the system processor is configured to resolve conflicts from the results with the assistance of the system AI engine.

Embodiment 5. The fixed retail scanner of Embodiment 4, wherein the system AI engine has loaded thereon a more complex and robust AI model compared with AI models loaded on the imager AI engines.

Embodiment 6. The fixed retail scanner of Embodiment 1, wherein a first AI model loaded on a first imager AI engine within a first camera module is different than a second AI model loaded on a second imager AI engine within a second camera module at the same time.

Embodiment 7. The fixed retail scanner of Embodiment 6, wherein the first AI model and the second AI model are different categorical types of AI models.

Embodiment 8. The fixed retail scanner of Embodiment 6, wherein the first AI model and the second AI model are same categorical types of AI models that have been fine-tuned over time to be differently trained.

Embodiment 9. The fixed retail scanner of Embodiment 1, wherein a first AI model loaded on a first imager AI engine within a first camera module is the same as a second AI model loaded on a second imager AI engine within a second camera module at the same time.

Embodiment 10. The fixed retail scanner of Embodiment 1, wherein multiple AI models are loaded on at least one of the system AI engine or the imager AI engines at the same time.

Embodiment 11. The fixed retail scanner of Embodiment 1, wherein the system processor is configured to generate a picklist based on results from multiple imager AI engines for display and selection by a user.

Embodiment 12. The fixed retail scanner of Embodiment 11, wherein the items placed on the picklist are further selected based on results from the system AI engine.

Embodiment 13. The fixed retail scanner of Embodiment 1, further comprising a system memory including a repository of different trained AI models stored thereon, the system memory operably coupled to the imager AI engines and the system AI engine for providing the trained AI models to be loaded by the respective AI engines responsive to requests by the system processor.

Embodiment 14. The fixed retail scanner of Embodiment 1, wherein the system processor is configured to maintain a dynamic schedule of AI tasks for each of the imager AI engines and the system AI engine.

Embodiment 15. The fixed retail scanner of Embodiment 14, wherein the dynamic schedule adjusts based on task requests sent to the respective AI engines and completion messages received from the respective AI engines.

Embodiment 16. The fixed retail scanner of Embodiment 15, wherein the task request includes an indication of a different AI model needing to be loaded on the respective AI engine.

Embodiment 17. The fixed retail scanner of Embodiment 14, wherein the dynamic schedule includes which AI engines are currently on line, a queue of current tasks being handled, and currently loaded AI models one the respective AI engines.

Embodiment 18. The fixed retail scanner of Embodiment 16, wherein the system processor is configured to assign a priority to an AI tasks when adding to the queue of current tasks for generating the tasks requests.

Embodiment 19. The fixed retail scanner of Embodiment 1, wherein each camera module includes an imager processor that interfaces between the system processor and the imager AI engine.

Embodiment 20. The fixed retail scanner of Embodiment 1, wherein the imager processor is configured to initiate AI tasks to its respective imager AI engine without first checking with the system processor.

Embodiment 21. The fixed retail scanner of claim 1, wherein the results from the AI tasks are based on bonuses or demerits based on image quality of the image data.

Embodiment 22. The fixed retail scanner of claim 1, further including any combination of Embodiments 2 through 21.

Embodiment 23. A method of operating the fixed retail scanner of any one of Embodiments 1 through 22 or combinations thereof.

Embodiment 24. A method of operating a fixed retail scanner including a data reader, the method comprising: receiving image data at a system processor disposed on a main board within the data reader, the system processor operably coupled to one or more camera modules and to a system artificial intelligence engine disposed within the data reader, each camera module including a local on-board imager AI engine configured to perform AI tasks according to a loaded trained AI model, and wherein the system artificial intelligence (AI) engine is configured to perform AI tasks according to a loaded trained AI model, scheduling and dispatching, via the system processor, AI tasks of the image data across a distributed network of AI resources including the imager AI engines and the system AI engine.

The foregoing descriptions are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although operations may be describes as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A fixed retail scanner including a data reader, comprising:
    a main board including one or more processors including a system processor disposed within the data reader;
    one or more camera modules disposed within the data reader and operably coupled with the system processor, each camera module including a local on-board imager AI engine configured to perform AI tasks according to a loaded trained AI model; and
    a system artificial intelligence (AI) engine disposed within the data reader and configured to perform AI tasks according to a loaded trained AI model,
    wherein the system processor is operably coupled to each of the imager AI engines and the system AI engine for scheduling and dispatching AI tasks across a distributed network of AI resources including the imager AI engines and the system AI engine, and
    wherein the system processor is configured to receive results from each of the imager AI engines and resolve conflicts from the results with the assistance of the system AI engine.

2. The fixed retail scanner of claim 1, wherein the system AI engine has loaded thereon a different AI model compared with AI models loaded on the imager AI engines.

3. The fixed retail scanner of claim 1, wherein a first AI model loaded on a first imager AI engine within a first camera module is different than a second AI model loaded on a second imager AI engine within a second camera module at the same time.

4. The fixed retail scanner of claim 3, wherein the first AI model and the second AI model are different categorical types of AI models.

5. The fixed retail scanner of claim 3, wherein the first AI model and the second AI model are same categorical types of AI models that have been fine-tuned over time to be differently trained.

6. The fixed retail scanner of claim 1, wherein a first AI model loaded on a first imager AI engine within a first camera module is the same as a second AI model loaded on a second imager AI engine within a second camera module at the same time.

7. The fixed retail scanner of claim 1, wherein multiple AI models are loaded on at least one of the system AI engine or the imager AI engines at the same time.

8. The fixed retail scanner of claim 1, wherein the system processor is configured to generate a picklist based on results from multiple imager AI engines for display and selection by a user, and wherein the items placed on the picklist are further selected based on results from the system AI engine.

9. The fixed retail scanner of claim 1, further comprising a system memory including a repository of different trained AI models stored thereon, the system memory operably coupled to the imager AI engines and the system AI engine for providing the trained AI models to be loaded by the respective AI engines responsive to requests by the system processor.

10. A fixed retail scanner including a data reader comprising:
    a main board including one or more processors including a system processor disposed within the data reader;
    one or more camera modules disposed within the data reader and operably coupled with the system processor, each camera module including a local on-board imager AI engine configured to perform AI tasks according to a loaded trained AI model; and
    a system artificial intelligence (AI) engine disposed within the data reader and configured to perform AI tasks according to a loaded trained AI model,
    wherein the system processor is operably coupled to each of the imager AI engines and the system AI engine for scheduling and dispatching AI tasks across a distributed network of AI resources including the imager AI engines and the system AI engine;
    wherein the system processor is configured to maintain a dynamic schedule of AI tasks for each of the imager AI engines and the system AI engine; and
    wherein the dynamic schedule includes which AI engines are currently on line, a queue of current tasks being handled, and currently loaded AI models one the respective AI engines.

11. The fixed retail scanner of claim 10, wherein the dynamic schedule adjusts based on task requests sent to the respective AI engines and completion messages received from the respective AI engines.

12. The fixed retail scanner of claim 11, wherein the task request includes an indication of a different AI model needing to be loaded on the respective AI engine.

13. The fixed retail scanner of claim 12, wherein the system processor is configured to assign a priority to an AI tasks when adding to the queue of current tasks for generating the tasks requests.

14. The fixed retail scanner of claim 1, wherein each camera module includes an imager processor that interfaces between the system processor and the imager AI engine.

15. The fixed retail scanner of claim 1, wherein the imager processor is configured to initiate AI tasks to its respective imager AI engine without first checking with the system processor.

16. The fixed retail scanner of claim 1, wherein the results from the AI tasks are based on bonuses or demerits based on image quality of the image data.

17. The fixed retail scanner of claim 10, further comprising wherein the system processor is configured to receive results from each of the imager AI engines and resolve conflicts from the results with the assistance of the system AI engine.

18. The fixed retail scanner of claim 10, wherein a first AI model loaded on a first imager AI engine within a first camera module is different than a second AI model loaded on a second imager AI engine within a second camera module at the same time.

* * * * *